(12) United States Patent
Maeda et al.

(10) Patent No.: US 8,104,403 B2
(45) Date of Patent: Jan. 31, 2012

(54) HEADER ASSEMBLY, SQUIB AND GAS GENERATOR FOR AIR BAG AND GAS GENERATOR FOR SEAT BELT PRETENSIONER

(75) Inventors: Shigeru Maeda, Himeji (JP); Dairi Kubo, Himeji (JP); Yasuaki Matsumura, Tokyo (JP); Toshiaki Furuya, Tokyo (JP)

(73) Assignee: Nipponkayaku Kabushikikaisha, Tokyo (JP)

( * ) Notice: Subject to any disclaimer, the term of this patent is extended or adjusted under 35 U.S.C. 154(b) by 135 days.

(21) Appl. No.: 12/516,980

(22) PCT Filed: Nov. 30, 2007

(86) PCT No.: PCT/JP2007/073229
§ 371 (c)(1),
(2), (4) Date: Sep. 17, 2009

(87) PCT Pub. No.: WO2008/066174
PCT Pub. Date: Jun. 5, 2008

(65) Prior Publication Data
US 2010/0066067 A1   Mar. 18, 2010

(30) Foreign Application Priority Data
Dec. 1, 2006   (JP) .................................. 2006-326222

(51) Int. Cl.
*F42B 3/13*   (2006.01)
(52) U.S. Cl. ............ 102/202.12; 102/202.7; 102/202.14
(58) Field of Classification Search ................... 102/200, 102/202.5, 202.7, 202.9, 202.12, 202.14, 102/206, 215, 218
See application file for complete search history.

(56) References Cited

U.S. PATENT DOCUMENTS
6,199,484 B1 *  3/2001  Martinez-Tovar et al.  102/202.4
(Continued)

FOREIGN PATENT DOCUMENTS
JP   2000108838   4/2000
(Continued)

OTHER PUBLICATIONS
PCT JP2007/073229 International Search Report of Dec. 19, 2007.
(Continued)

*Primary Examiner* — James Bergin
(74) *Attorney, Agent, or Firm* — Allston L. Jones; David J. Aston; Peters Verny, LLP

(57) ABSTRACT

A header assembly includes a header holding a plurality of electrode pins to be insulated from one another, an ignition element mounting capacitor having at the center of its outer circumferential surfaces external terminal electrodes for electrically connecting to an ignition element mounted on the capacitor, an IC having first, second, and third electrode pads to be electrically connected to end electrodes of the ignition element mounting capacitor and the external terminal electrodes and further having connection electrodes to be electrically connected to the electrode pins of the header for communication with the external. The IC is located on the header, and the ignition element mounting capacitor is located on the IC and electrically connected to the electrode pins through the connection electrodes provided on the IC. The invention provides a squib enabling a size to be minimal and quality to be improved, while maintaining high productivity, and hence provides the header assembly and the ignition element mounting capacitor as components of the squib, and further a gas generator with the squib installed therein for an air bag, and a gas generator having the squib installed therein for a seat belt pretensioner.

9 Claims, 9 Drawing Sheets

U.S. PATENT DOCUMENTS

| | | | |
|---|---|---|---|
| 6,820,557 B2 * | 11/2004 | Okamoto et al. | 102/218 |
| 7,069,860 B2 * | 7/2006 | Okamoto et al. | 102/218 |
| 7,155,353 B2 * | 12/2006 | Okamoto et al. | 702/65 |
| 7,168,737 B2 * | 1/2007 | Okamoto et al. | 280/735 |
| 7,343,859 B2 * | 3/2008 | Matsuda et al. | 102/217 |
| 7,364,190 B2 * | 4/2008 | Okamoto et al. | 280/735 |

FOREIGN PATENT DOCUMENTS

| | | |
|---|---|---|
| JP | 2000337797 | 8/2000 |
| JP | 3463263 B2 | 5/2003 |
| JP | 2003205823 | 7/2003 |
| JP | 2005308339 | 4/2005 |
| JP | 3115619 | 9/2005 |
| JP | 2005326041 | 11/2005 |
| JP | 3118047 U | 12/2005 |
| JP | 3118048 U | 12/2005 |
| WO | 9419661 A1 | 9/1994 |
| WO | 9902937 A1 | 1/1999 |
| WO | 0043727 A3 | 7/2000 |

OTHER PUBLICATIONS

English Translation of Office Action dated Dec. 14, 2010, in Japanese Patent Application 2006-326222.

* cited by examiner (a)

(b)

(c)

(a)

(b)

(a)

(b)

HEADER ASSEMBLY, SQUIB AND GAS GENERATOR FOR AIR BAG AND GAS GENERATOR FOR SEAT BELT PRETENSIONER

CROSS-REFERENCE TO RELATED APPLICATIONS

This application claims priority from PCT application PCT/JP2007/073229, filed on Nov. 30, 2007, which is hereby incorporated by reference in its entirety, and this application further claims priority to Japanese Patent Application No. 2006-326222 filed on Dec. 1, 2006.

TECHNICAL FIELD

This invention relates to a squib to be installed in a gas generator or the like used in a safety device for a car such as an air bag and the like. Moreover, this invention relates to a header assembly which is a component of the squib described above.

Further, this invention relates to a gas generator with such a squib installed therein for an air bag, and a gas generator with the squib for a seat belt pretensioner.

BACKGROUND ART

A various kinds of electric squibs have been developed as squibs for gas generators for inflating air bags equipped in cars.

Such a squib usually has metal pins for electrically connecting to the external, and a heating element at the other ends of the metal pins for igniting an explosive.

With hitherto used ignition devices, bridging wires have been used for igniting ignition powder. Nichrome wires have been used as bridging wires. If wire diameters are too fine, the bridging wires could not be attached. When using bridging wires of diameters enabling the wires to be attached, however, the wires of such diameters generally have large heat capacities so that sufficient electrical charges must be stored in capacitors having great capacities for the purpose of igniting ignition powder only by energy of communication as is the case with a BUS system.

As another ignition device, moreover, a method has been known for forming a thick film resistor directly on a printed circuit board using the technique for producing the printed circuit board.

For example, Patent Document 1 has disclosed a squib using a printed circuit board on which a thick film resistor is directly formed, and a varistor is mounted on another part on the printed circuit board for the purpose of electrostatic protection.

Further, Patent Document 2 has disclosed a squib obtained by production steps of mounting a resistive heating element on a printed circuit board likewise, connecting a capacitor and a varistor to the printed circuit board by soldering, and further connecting the product thus obtained to electrode pins.

Although, these ignition devices have been improved to reduce the energy required for ignition in comparison with the case using the bridging wires, the reduction in required energy has remained insufficient.
Patent Document 1: Official Gazette of Japanese Patent Application Laid Open No. 2003-205,823
Patent Document 2: Official Gazette of Japanese Patent Application Laid Open No. 2000-108,838

On the other hand, the semiconductor bridge (SCB) is a generic designation of bridges produced using the semiconductor technique such as a sputtering, vapor deposition, and the like. Ignition devices using semiconductor bridges are of a very fine structure having narrow widths of lines as compared with those using bridging wires or printed circuit boards. Further, the ignition devices using semiconductor bridges utilize thin film bridges whose film thicknesses are of the order of a few microns so that it is possible to make their heat capacity smaller so as to have quick responsibility and ignition ability with low energy. The bridge wires require time period of 800 to 1,000 microseconds for heating ignition powder to its ignition temperature with electric current of 1.2 A so that the energy required for ignition is of the order of 2.9 mJ. In contract therewith, the semiconductor bridges enable ignition powder to be ignited by energy less than 0.44 mJ using discharge from a capacitor having a small capacity. With the SCB, since semiconductor production equipment such as for sputtering and vapor deposition may be used, it is possible not only to make the board remarkably smaller but also to make the heat capacity of heating part smaller and to accurately control the heat capacity, thereby stably producing squibs which are higher in ignition responsibility and enable ignition with low energy.

Moreover, a squib having an IC built therein has been disclosed in Patent Document 3 in order to make it possible to perform an ignition by means of communication called BUS system.

With this ignition device, a second small semiconductor plate including integrated circuits is located on a header, and further sequentially laminated thereon are a first small semiconductor plate including a capacitor having stored energy for igniting an ignition element and a third small semiconductor plate including the ignition element.
Patent Document 3: Official Gazette of PCT Japanese Phase Publication No. 2000-513,799

DISCLOSURE OF THE INVENTION

Task to be Solved by the Invention

In the case using the semiconductor bridges (SCB), the wire bonding is used for connecting the SCB according to the Patent Document 3 as described above. In order to ignite the ignition powder, the SCB must be brought into close contact with the ignition powder, and therefore there would be a risk of breaking down of the wire bonding due to the forces required for the close contact between the SCB and ignition powder. Moreover, the semiconductor capacitor is used as the capacitor for storing the energy for ignition according to the Patent Document 3. However, as the electric energy that the semiconductor capacitor can store is a little, it is needed to use an SCB having a high ignition sensibility to ignite the ignition powder by such a slight energy. In this case, the high ignition sensibility would increase a risk of erroneous explosion due to noise.

In order to improve the reliability in ignition, it is preferable to increase the energy stored in the capacitor and to cause the discharge waveform of electric current from the capacitor for ignition to be sharper.

In the case that the ignition element and the capacitor are located on the header, furthermore, as the surface of the header substrate becomes uneven, there would be worrying problems such as irregularities in density of the ignition powder caused when the header is combined with the cup body having the ignition powder packed therein.

The invention is capable of advantageously solve the problems described above, and the invention has an object to provide a squib enabling a size to be minimal and reliability to be improved, while maintaining high productivity, together with a header assembly as one component of the squib, and further a gas generator with the squib installed therein for an air bag, and a gas generator having the squib installed therein for a seat belt pretensioner.

Solution for the Task

By the way, the inventors of the present case have earnestly investigated to solve the problems described above and have obtained the following recognitions.
(1) Without separately arranging an ignition element and a capacitor on a header, if a construction mounting the ignition element on the capacitor is employed, a miniaturization of a squib can be achieved.
(2) A capacitor is located immediately on an IC and an ignition element is located immediately on the capacitor so that the ignition element and the IC are connected through external terminal electrodes provided on the capacitor, thereby obtaining high ignition reliability.
(3) With the above arrangement, unevenness of the surface mainly caused by the thickness of the capacitor would provide a problem. For solving this problem, the region except for the element surface of the ignition element is covered by a resin whose outer diameter is substantially equal to the outer circumferential diameter of the header and whose head reaches the level of the height of the ignition element, thereby enabling the contact surface with the ignition powder to be flattened.
(4) Employing a ceramic capacitor as the capacitor makes it possible to obtain an arrangement of electrodes within a size enabling the capacitor to be directly mounted on an IC, and simultaneously both miniaturization and ignition reliability can be achieved. The invention is based on the recognitions described above.

Namely, the essential features of the invention are as follows.

1. A header assembly having a plurality of electrode pins and closing the opening of a cup body having ignition powder therein,
characterized in that said header assembly comprises:
a header holding said plurality of electrode pins to be insulated from one another, an ignition element mounting capacitor including at the center of outer circumferential surfaces external terminal electrodes for electrically connecting to an ignition element mounted on the capacitor, and
an IC including first, second, and third electrode pads to be electrically connected to end electrodes of said ignition element mounting capacitor and said external terminal electrodes, and further including connection electrodes to be electrically connected to the electrode pins of said header for communication with the external, and
that said IC is located on said header, and said ignition element mounting capacitor is located on said IC and electrically connected to said electrode pins through said connection electrodes provided on said IC.

2. In the above 1, the header assembly characterized in that said capacitor is a ceramic capacitor.

3. In the above 1 or 2, the header assembly characterized in that said ignition element is an SCB chip comprising an SCB and its substrate.

4. In any one of the above 1 to 3, the header assembly characterized in that arranged on said header is a cylindrical collar having an outer diameter substantially equal to the outer circumferential diameter of said header and the cylindrical head reaching at least a level of the height of said ignition element, and that a resin is filled in a region inside said collar except for the element surface of said ignition element, thereby making flat the contact surface with the ignition powder.

5. A squib characterized in that the header assembly claimed in any one of claims 1 to 4 is press-fitted in and fixed to the opening of a cup body having ignition powder therein.

6. A gas generator for an air bag, having the squib described in the above 5.

7. A gas generator for a seat belt pretensioner, having the squib described in the above 5.

Effects of the Invention

Effects of the invention can be enumerated as follows.
(1) The construction mounting the ignition element on the capacitor is employed to achieve a more miniaturization of the squib.
(2) The capacitor for ignition is located immediately on the IC and the ignition element is located immediately on the capacitor so that the ignition element is connected to the IC by the external terminal electrodes, with the result that the flow passage of electric current flowing through the ignition element is very short when the switching circuit in the IC is turned on. Therefore, inductance components become small and hence losses become small so that sharp discharge waveforms from the capacitor can be transmitted to the ignition element without being modified, with the result that the ignition reliability is remarkably improved.
(3) The respective parts are laid on the header and the contact surface with the ignition powder is flattened by a resin so that irregularities in density of the ignition powder can be eliminated when the ignition element is pushed to the ignition powder. The compact header assembly can be constructed. Further, as the ignition powder is securely insulated from the respective electrodes, erroneous ignition of the ignition means can be prevented.
(4) Since the ceramic capacitor is used as the capacitor, the electrodes can be arranged within a size enabling direct mounting on the IC, and at the same time great electrostatic capacitances can be held, thereby enabling a miniaturization and an improvement in ignition reliability.
Moreover, the energy enabling to be stored is great so that an SCB having a low ignition sensibility can be used, thereby enabling erroneous ignition caused by noise to be reduced.
(5) As the ignition element is connected to the IC through the third external terminal electrodes provided on the capacitor, the ignition element on the uppermost surface and the IC on the lowermost surface can be electrically connected without using the wire bonding so that a high ignition reliability can be achieved because there is no wire bonding at the contact surface with the ignition powder.

DESCRIPTION OF THE REFERENCE NUMERALS

Figure 1:
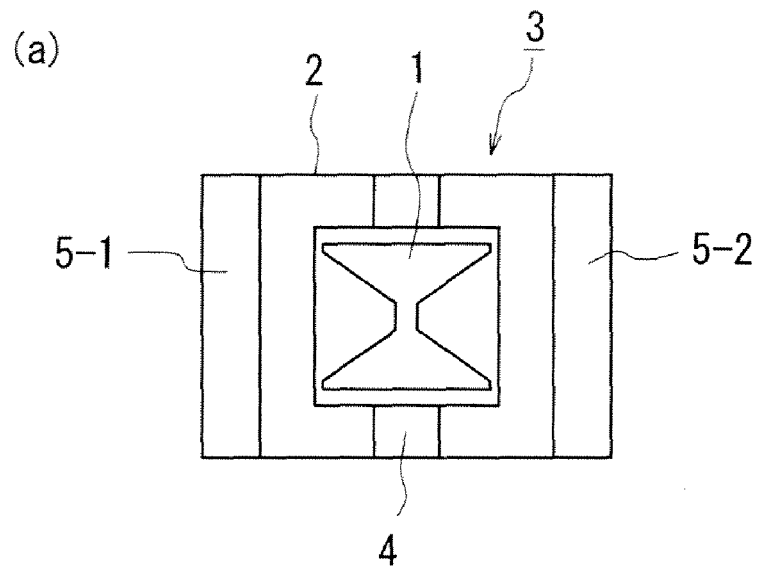
FIG. 1 illustrates a preferred example of the ignition element mounting capacitor according to the invention in a plan view (a), a bottom view (b) and a side view (c)
Figure 1:
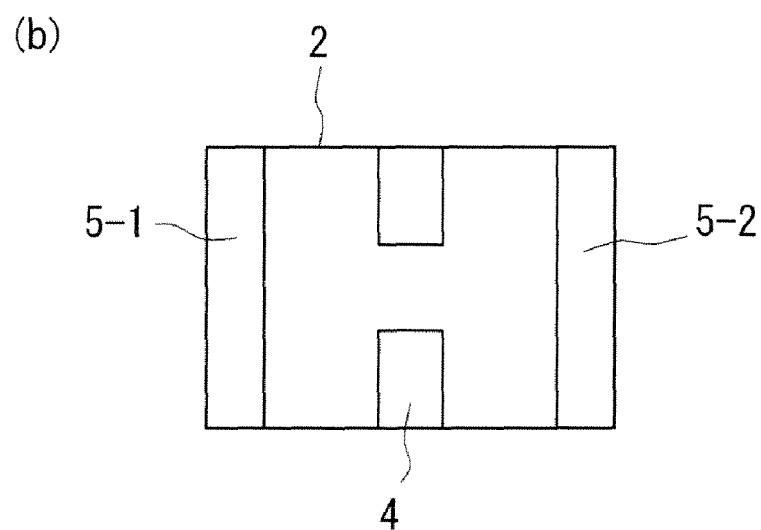
Figure 1:
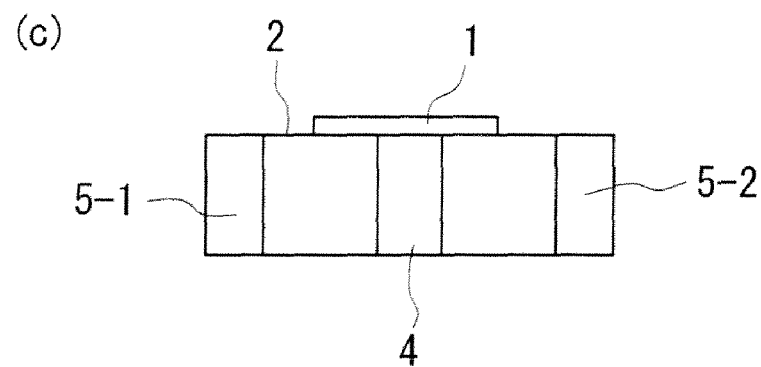

1 Ignition element
2 Capacitor body
2-1 Mounted surface of capacitor
3 Ignition element mounting capacitor
4 External terminal electrode
5-1 End electrode of capacitor
5-2 End electrode of capacitor
6 Thin film resistor (SCB)
7 SCB substrate
8 SCB chip
9 Side electrode
10 Cover electrode
11 Side through-hole electrode
12 IC
12-1 First electrode pad for connecting to end electrode of capacitor
12-2 Second electrode pad for connecting to end electrode of capacitor
12-3 Third electrode pad for connecting to external terminal electrode
12-4 Fourth electrode pad for connecting to electrode pin
13 Header
14, 14' Electrode pins
15 Sealing glass
16 Header assembly
17 Cylindrical collar
18 Resin
19 Ignition powder
20 Cup body
21 Protective resin cup
22 Insulating layer
23 Metal layer
31 Gas generator for air bag
32 Squib
33 Enhancer
34 Gas generating agent
35 Filter
36 Outer case
37 Hole
41 Gas generator for seat belt pretensioner (micro gas-generator)
42 Squib
43 Gas generating agent
44 Base (holder)
45 Cup body
110 Central control unit
111a to 111d Air bag modules
114, 115 Electrode pins

BEST MODE FOR CARRYING OUT THE INVENTION

The invention will then be specifically explained.

FIG. 1 illustrates a preferable example of the ignition element mounting capacitor according to the invention in a plan view (a), a bottom view (b) and a side view (c). In the drawings, reference numeral 1 denotes an ignition element, and reference numeral 2 shows a capacitor body. The ignition element 1 is mounted on the capacitor body 2 to construct the ignition element mounting capacitor 3.

The capacitor body 2 is provided at the center of its outer circumferential surface with external terminal electrodes 4 which are electrically connected to the ignition element 1. Reference numerals 5-1 and 5-2 illustrate end electrodes of capacitor, respectively.

As the capacitor used in the invention, the ceramic capacitor is particularly advantageously applicable. In this case, the capacity of the capacitor section is preferably of the order of 0.5 to 10 μF.

In this invention, moreover, the capacitor is not limited to the ceramic capacitor. A film capacitor may be used, which uses a heat resistant resin as dielectric layers.

And now, the ignition element is mounted on the capacitor body according to the invention. The surface of the capacitor on which the ignition element is mounted is any surface so long as it is a surface other than the mounted surface for mounting the capacitor on an IC described later. It is beneficial to mount the ignition element on the surface (upper surface) of the capacitor opposite from the mounted surface of the capacitor.

The external terminal electrodes are then electrically connected to the ignition element. This connection is not limited to a particular configuration. A case that an SCB chip consisting of an SCB and its substrate is used as the ignition element will be explained, hereinafter.

Figure 2:
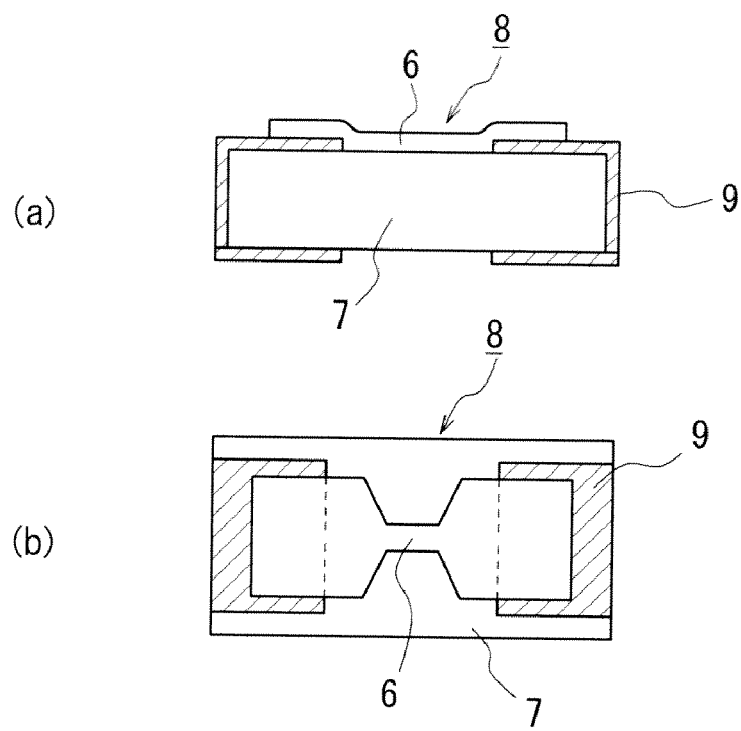
FIG. 2 illustrates the SCB chip having side electrodes in a sectional view (a) and a plan view (b)

One example of its construction is illustrated in (a) and (b) of FIG. 2, in which reference numeral 6 shows a thin film resister (SCB), and reference numeral 7 denotes its substrate, both members forming an SCB chip 8. Reference numeral 9 shows side-electrodes provided on the SCB chip substrate 7 as relay conductors for connecting the SCB 6 to the external terminal electrodes.

As shown in the drawing, the SCB chip substrate 7 is provided with the side electrodes 9 extending from the upper surface to the lower surface of the substrate 7 so that the SCB 6 is electrically connected through the side electrodes 9 to the external terminal electrodes. The SCB 6 has a construction formed, for example, by alternately laminating Ti layers and SiO$_2$ layers. As the material of the side electrodes 9, for example, Au, Ni, or the like may be used.

Figure 3:
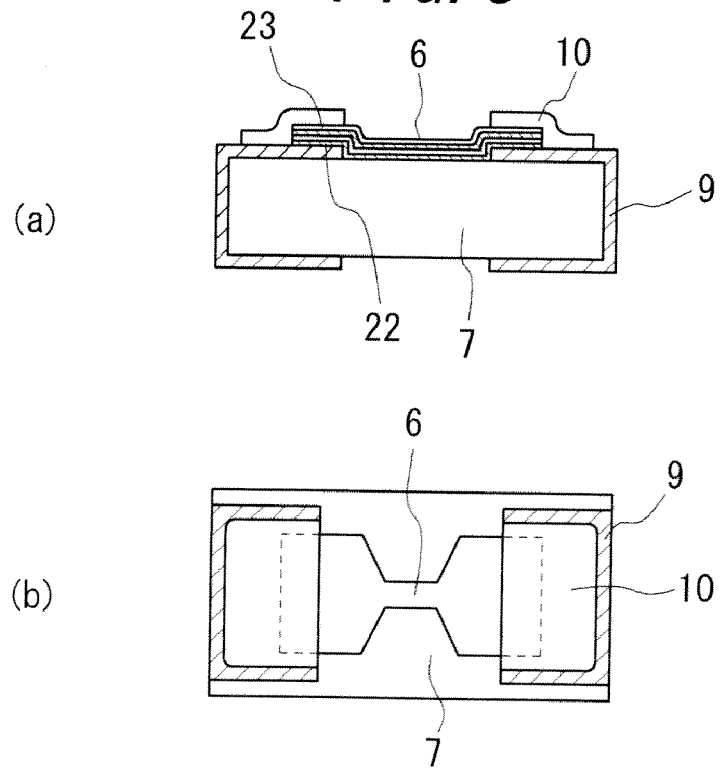
FIG. 3 illustrates the SCB chip using cover electrodes for electrical continuity between the side electrodes and the SCB of a laminated structure in a sectional view (a) and a plan view (b)

In FIG. 3, an example employing a laminated structure including insulating layers as the SCB 6 is shown in (a) and (b) illustrating cover electrodes 10, and insulating layers 22 and metal layers 23 of a laminated structure.

In the event that the SCB 6 is made of a single layer, the SCB 6 is connected to the side electrodes 9 by merely superimposing the side electrodes on both ends of the SCB 6 as described above. In the case that the SCB 6 is made of plural layers having insulating layers therebetween, the cover electrodes 10 are provided at locations covering the ends of the SCB and the side electrodes 9, thereby ensuring the electrical continuity between the side electrodes 9 and both the ends of the SCB.

Another connection configuration will then be explained.

Figure 4:
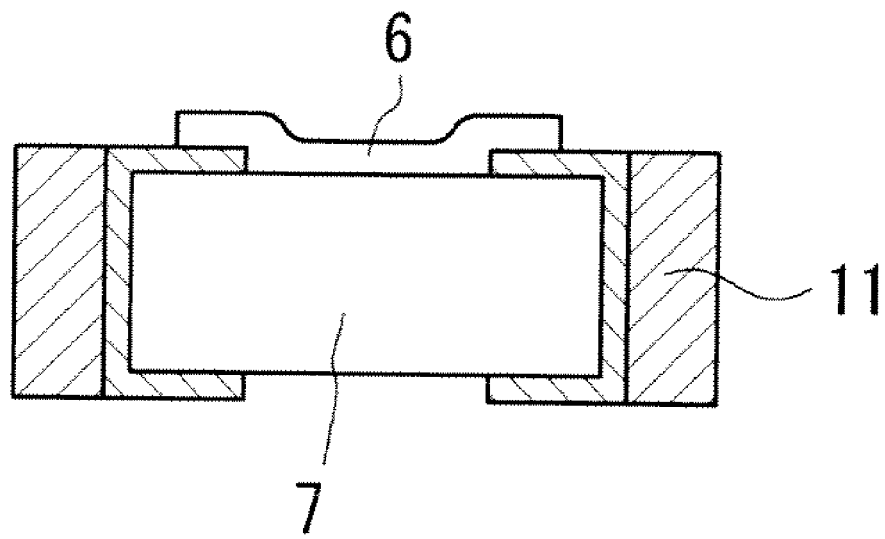
FIG. 4 illustrates an SCB chip having side through-hole electrodes as side electrodes in a sectional view (a) and a plan view (b)
Figure 4:
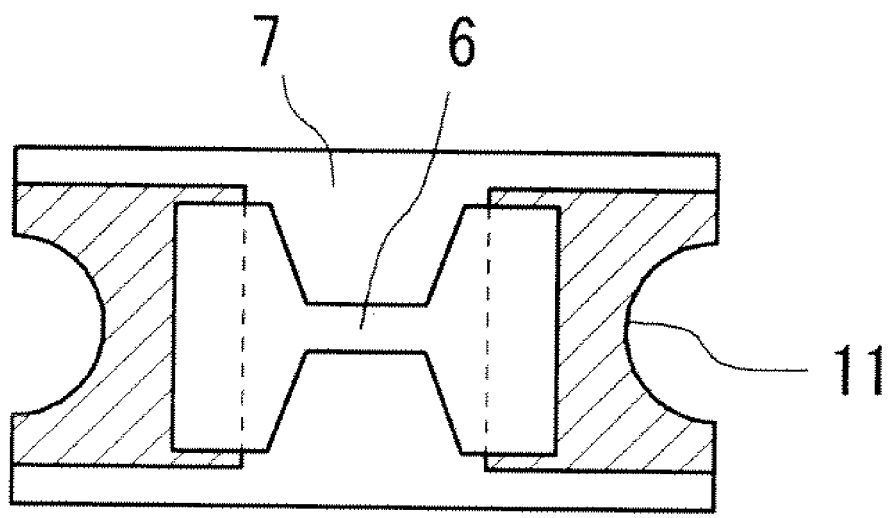

FIG. 4 shows a use of side through-hole electrodes 11 as an another example of the side electrodes. Before forming the film of an SCB 6, a substrate 7 is formed with through-hole electrodes, and after the film of the SCB 6 has been formed, the product cut out through the through-hole electrodes, when the product is divided into chips in the final step, whereby the semicircular side through-hole electrodes 11 are formed in a state that they are exposed at side surfaces of the SCB chip substrate 7. In addition, the shape of the side through-hole electrodes 11 is not to be limited to the circular, and the side through-hole electrodes 11 can be of any shape by the use of micro blasting, laser machining, or the like. Further, by using these methods the side electrodes can be formed in a simpler manner. Even with the case employing an SCB 6 of the laminated construction including the metal layers 23 and the insulating layers 22 in this method, moreover, the electrical continuity with the side through-hole electrodes 11 can be ensured by the use of the cover electrodes 10 as described above.

The material from which to form the substrate of the SCB chip may be any one so long as it can be used as printed circuit board. Particularly preferable are glass substrate, ceramic substrate, LTCC (Low Temperature Co-fired Multilayer Ceramic Substrates), silicon substrate, and the like. The reason for selecting these materials is that a resistive heating element is supplied with electric energy to generate heat, by means of which the explosive or ignition powder is heated to an ignition temperature of about 300° C. so as to be ignited so that preferably the substrate is stable until at this ignition temperature.

The IC on which the ignition element mounting capacitor is mounted will then be explained.

Figure 5:
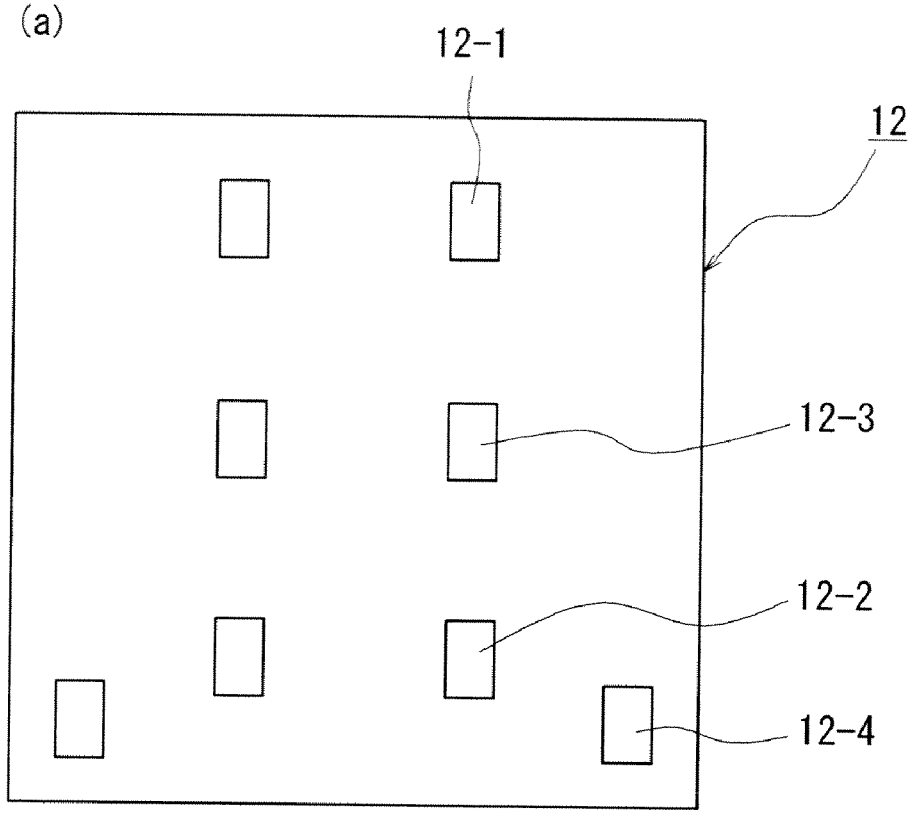
FIG. 5 illustrates an IC for mounting the ignition element mounting capacitor in a plan view (a) and another plan view (b) showing the IC on which an SCB chip is located.
Figure 5:
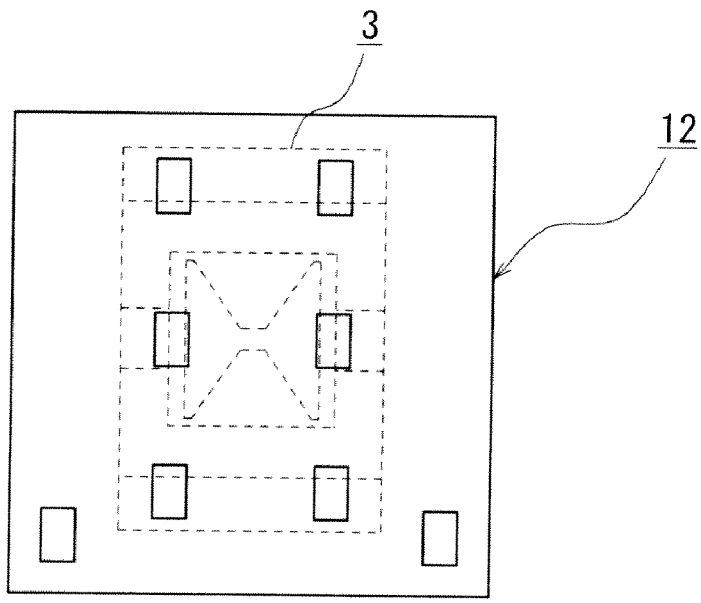

As shown in FIG. 5, the IC 12 comprises electrode pads for connecting to the end electrodes of the capacitor, electrode pads for connecting to the external terminal electrodes, and electrode pads for connecting to electrode pins for connecting to the external, and the ignition element is actuated through these electrode pads. In the drawing, the first electrode pads 12-1 are electrode pads for connecting to the end electrodes 5-1 of the capacitor, the second electrode pads 12-2 are for connecting to the end electrodes 5-2 of the capacitor, the third electrode pads 12-3 are for connecting to the external terminal electrodes, and the forth electrode pads (communication electrodes) 12-4 are for connecting to electrode pins.

As the material for such a substrate for the IC, silicon or the like is advantageously applicable.

Signals for communication from the external are transmitted to the IC through the fourth electrode pads 12-4 of the IC 12 connected to the electrode pins. The IC 12 reads out required information from the signals and at the same time stores energy in the capacitor for igniting the ignition element through the end electrodes connected to the first and second electrode pads 12-1 and 12-2. And, the third electrode pads 12-3 are connected to the SCB through the external terminal electrodes. The IC 12 can exchange information to and from the central control unit of an air back system through communication therebetween. When the central control unit detects a collision of a car, a command of ignition is transmitted to a desired IC through a signal by means of which a desired squib is ignited. The IC of the squib requested to ignite can flow the energy stored in the capacitor to the SCB by means of a switching circuit in the IC. On supplying the SCB with the energy from the capacitor, the SCB is heated to ignite ignition powder.

A header assembly in which the IC and the ignition element mounting capacitor as described above are built will then be explained.

Figure 6:
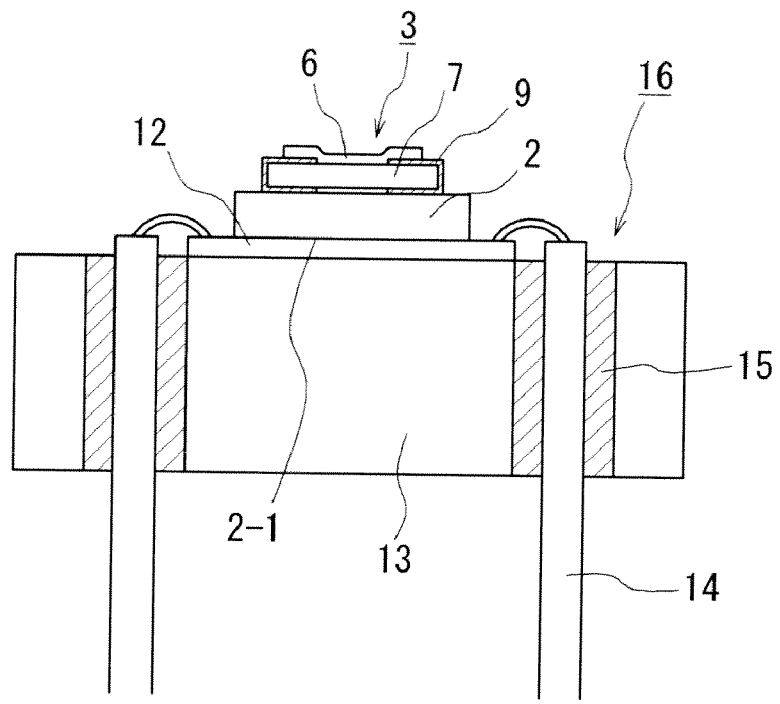
FIG. 6 is a sectional view of a preferable example of the header assembly according to the invention.

FIG. 6 illustrates a favorable header assembly according to the invention by way of example.

The drawing shows a header 13, electrode pins 14, and sealing glass 15 for insulating such electrode pins 14 from each other.

Then, an IC 12 is mounted on the header 13 on which the ignition element mounting capacitor 3 is further mounted to construct the header assembly 16. Moreover, reference numeral 2-1 in the drawing illustrates the mounted surface of the capacitor 2.

In this place, solder or conductive paste is advantageously applicable to connecting means for the end electrodes 5-1 and 5-2 of the ignition element mounting capacitor (FIG. 1), the external terminal electrodes 4 provided at the center of the outer circumferential surfaces of the capacitor body 2 (FIG. 1), and the first, second and third electrode pads 12-1, 12-2, and 12-3 provided on the IC 12 (FIG. 5). Moreover, it is also advantageous to use the solder and conductive paste for connecting the fourth electrode pads 12-4 provided on the IC 12 and the electrode pins 14. In this case, it is needed to cover the solder or conductive paste with an insulator. In the case that the upper surface of the header is covered with a resin later described, it is possible to use wire bonding for connecting the fourth electrode pads 12-4 and the electrode pins 14.

Figure 7:
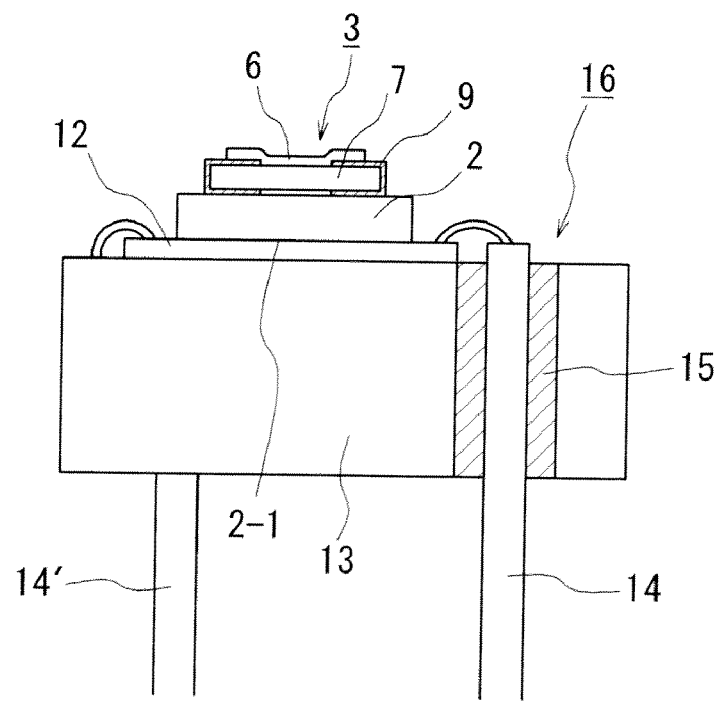
FIG. 7 is a sectional view of an example mounting an SCB chip and a capacitor according to the invention on a header whose one electrode pin is grounded.

Further, FIG. 7 illustrates another header assembly according to the invention. This example is the case that one electrode pin 14' is directly attached to a metal part of a header 13.

By employing such a construction connecting the metal part of the header and the one electrode pin, any erroneous ignition can be securely prevented even when static electricity is applied to the electrode pins and metal parts of the header.

By the way, as can be seen from FIGS. 6 and 7, when the IC 12 and the ignition element mounting capacitor 3 are mounted on the header 13, the mounted area protrudes from the header 16 by the thicknesses of the IC 12 and the ignition element mounting capacitor 3.

In the event that the upper surface of the header 13 is uneven in this manner, when such a header assembly 16 is inserted into a cup body to be in contact with the ignition powder under pressure, although the ignition powder above the ignition element 6 is densely compressed, the ignition powder around the ignition element 6 becomes of lower density which would cause severe irregularities in ignition sensitivity and time to ignition upon operating the squib so that there would be the risk of an impediment to the stable operation of a squib.

In order to overcome such adverse effects, it is preferable to cover the header with a resin whose outer diameter is substantially equal to the outer circumferential diameter of the header and whose head reaches at least the level of the height of the ignition element.

Figure 8:
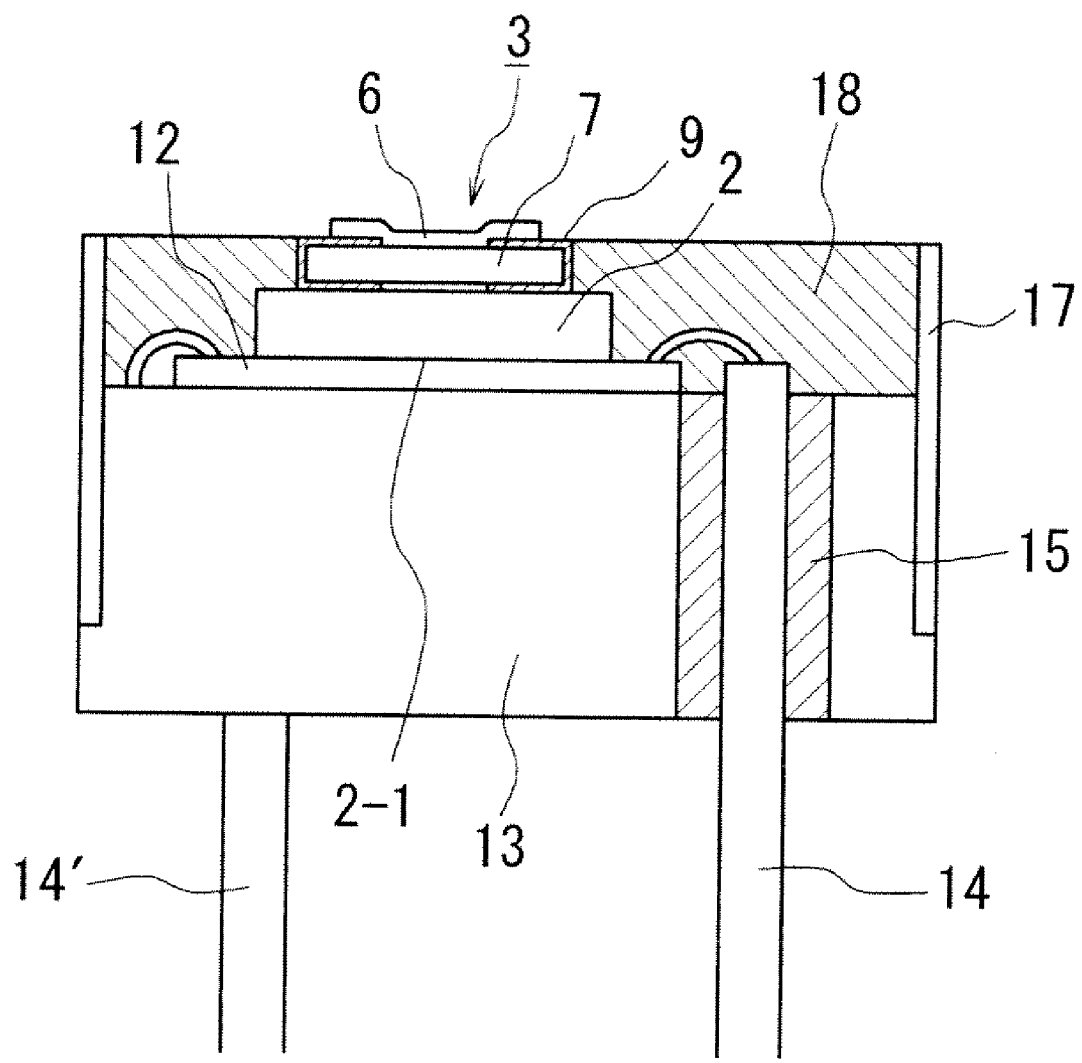
FIG. 8 is a view illustrating the state that the header is provided on its outer circumference with a cylindrical collar into which a resin is packed.

For forming such a resin covering, as shown, for example, in FIG. 8, a cylindrical collar 17 is provided on the outer circumference of the header 13 such that the head of the collar 17 is at least substantially at the level of the height of the ignition element 6, and the cylindrical collar 17 is filled or packed with a resin 18.

By packing the collar 17 with the resin 18, the inner area of the cylindrical collar 17 becomes flat, with the result that the pressed density of the ignition powder in the cup body can be uniformed.

In doing so, if the filled resin 18 covers the element surface of the ignition element 6, the ignition powder could not be ignited, and therefore in packing with the resin 18, it is important to pack the collar 17 with the resin 18 except for the element surface of the ignition element 6.

In packing the collar with the resin 18, it is most suitable to make the heights of the ignition element 6 and the resin 18 substantially the same as described above. However, if it is tried to make equal the levels of heights of the ignition element 6 and the resin 18 filled around it, there is a risk of the filled resin 18 covering even the element surface of the ignition element 6.

Therefore, the inventors of the present case have investigated the relation between the operation stability of the squib and difference H between levels of heights of the element surface of the ignition element 6 and the upper surface of the resin 18. As a result, they have ascertained that if the difference H between the levels of the heights is preferably within 0.5 mm, more preferably within 0.3 mm, there is little or no change in the operation stability of the squib.

Figure 9:
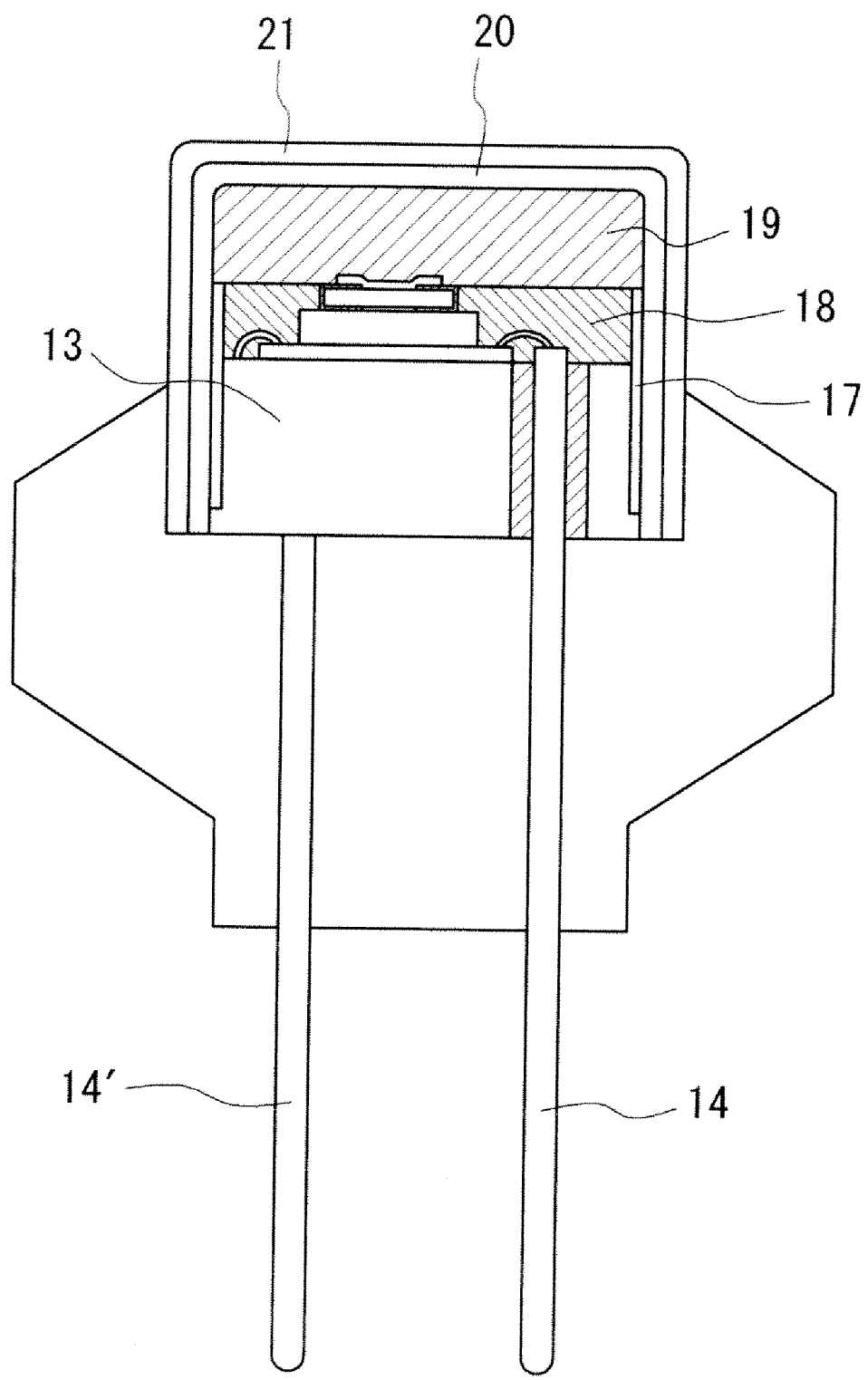
FIG. 9 is an overall view of a squib according to the invention.

Then, a squib as a whole is shown in section in FIG. 9, which is completed by press-fitting and fixing the header assembly as described above in the opening of a cup body having ignition powder therein.

FIG. 9 illustrates ignition powder 19, a cup body 20, and a protective resin cup 21. As shown in the drawing, as the resin 18 is filled in the cylindrical collar 17, the upper surface of the header 13 is flat so that when such a header assembly is press-fitted in the cup body, there is no difference in density of the ignition powder, with the result that irregularities of ignition sensitivity and time to ignition do not occur when the squib is actuated.

As the ignition powder for use in the present invention, it is preferable to contain zirconium in its composition. Other than this, those containing titanium hydride, boron or lead trinitroresorcinate are advantageously applicable to the ignition powder. Moreover, as the ignition powder other than those described above, there are those disclosed in the specification of Japanese Patent Application Laid Open No. 2002-362,992. Ignition powders are not particularly limited for this purpose, and the thin film resistor as a resistive heating element is arranged in contact with such an ignition powder.

In the present invention, further, the upper surface of the ignition element may be previously coated with an ignition powder composition. In more detail, ignition powder in the form of slurry is dispensed onto the upper surface of a thin film resistor and is dried. In comparison with the case of ignition powder simply packed, the coated and dried ignition powder composition contacts the thin film resistor in a stable condition which effectively contributes to a reliable ignition and shortening of ignition time.

A gas generator for an air bag using the ignition device according to the invention will then be explained.

Figure 10:
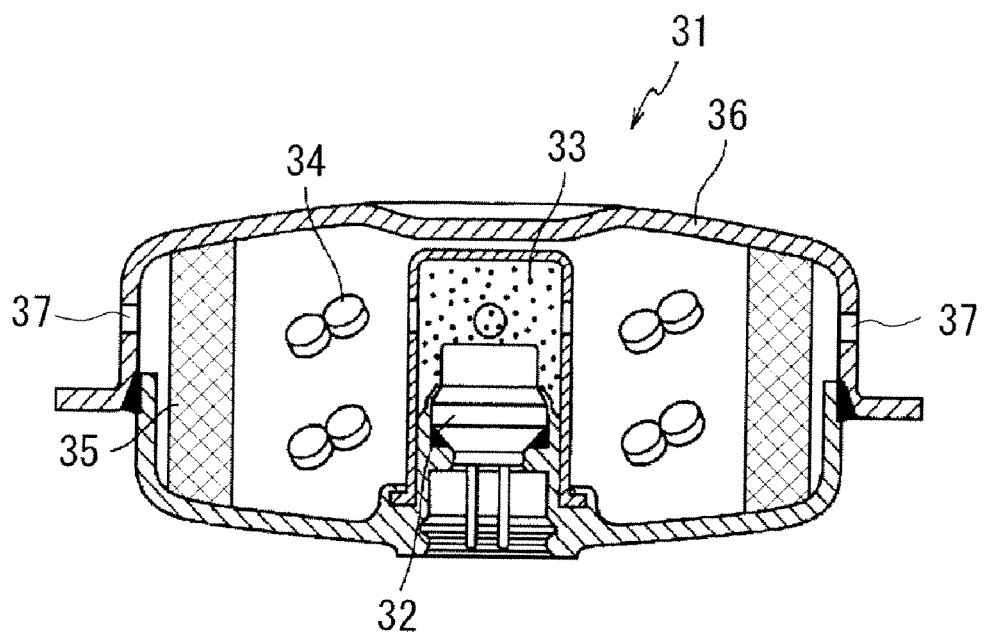
FIG. 10 is a conceptual view of a gas generator for an air bag.

FIG. 10 is a conceptual view of a gas generator for an air bag. As shown in the drawing, the gas generator 31 for the air bag comprises therein a squib 32, an enhancer 33, gas generating agent 34, and filters 35, and further an outer case 36 defining the outside of the generator and withstanding the pressure when the gas generating agent 34 is burned. The outer case 36 is formed with holes 37 for discharging the generated gas into the air bag.

When the squib 32 is actuated, the enhancer 33 burns by heat energy produced from the squib 32 to generate flame and thermal particles by means of which the gas generating agent 34 is burned to generate a gas for inflating the air bag. The generated gas is discharged out of the outer case 36 through the holes 37 formed in the outer case 36.

At this time, the gas passes through the filters 35 so that residues of the burned gas generating agent are collected at the filters, and the gas itself is cooled simultaneously.

Moreover, a gas generator (micro gas-generator) for a seat belt pretensioner using the ignition device according to the invention will be explained.

Figure 11:
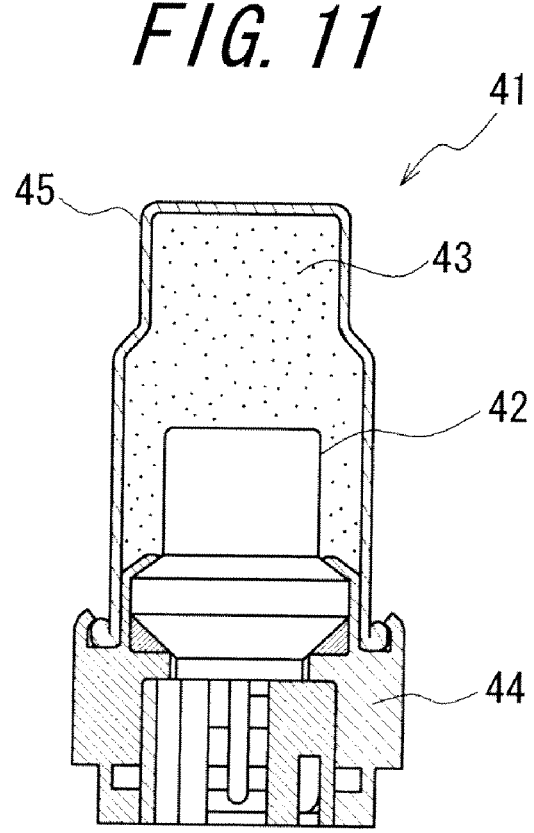
FIG. 11 is a conceptual view of a gas generator for a seat belt pretensioner.

FIG. 11 is a conceptual view illustrating the gas generator (micro gas-generator) for a seat belt pretensioner. As shown in the drawing, the micro gas-generator 41 comprises therein a squib 42 and a gas generating agent 43. The squib 42 is fixed to a base 44 called a holder. Further, a cup body 45 for storing a gas generating agent 43 therein is also fixed to the holder by means of, for example, crimping. When the squib 42 is actuated, the gas generating agent 43 in the cup body 45 is burned by the flame and the thermal particles coming from the squib 42 to generate a gas.

Figure 12:
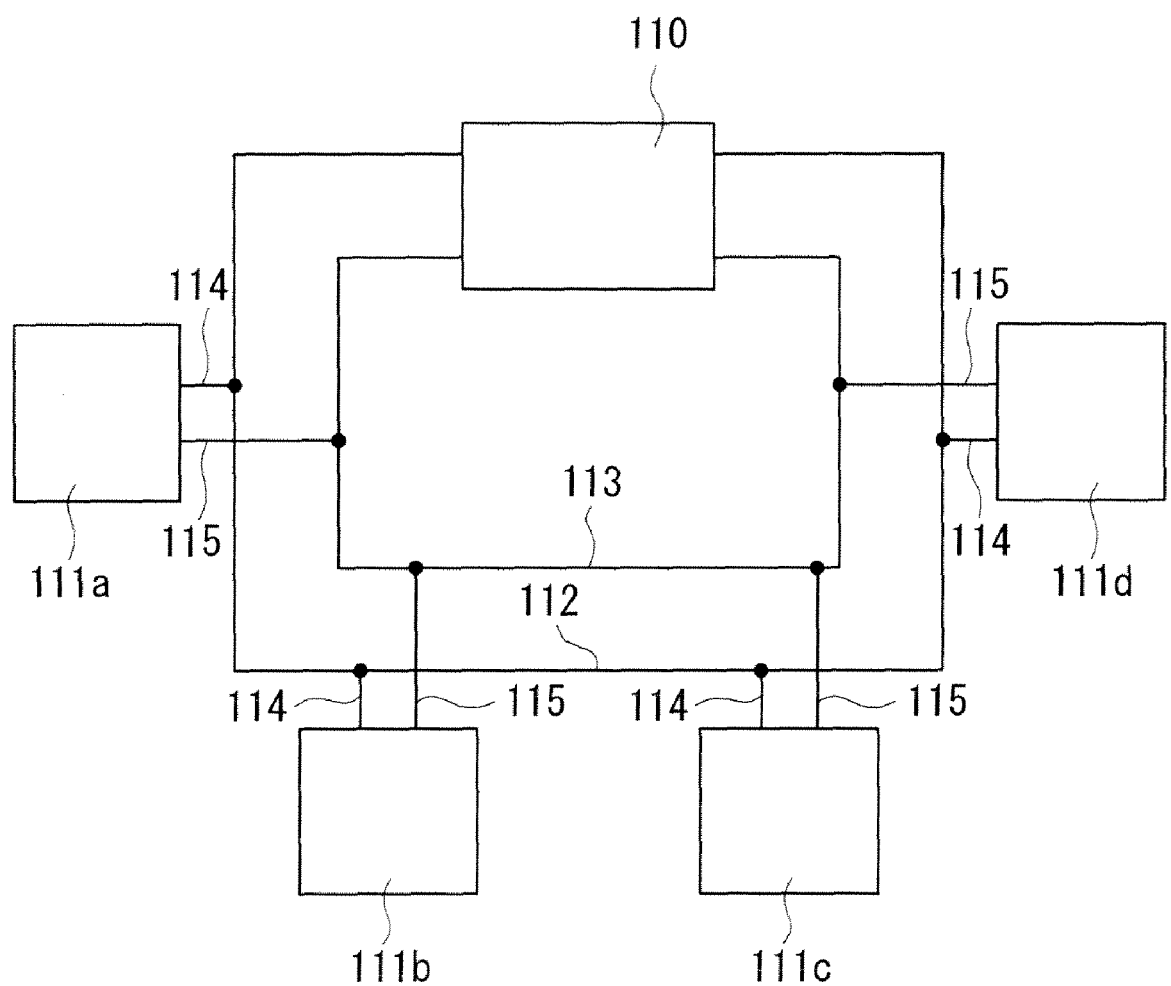
FIG. 12 is an explanatory view of a central control unit.

The control procedure by the central control unit will then be explained. FIG. 12 illustrates an example of the air bag system linked to a local area network (LAN) and connected to the central control unit 110 and four air bag modules 111a, 111b, 111c and 111d. The two air bag modules 111b and 111c each may have a gas generator for inflating, for example, a front air bag, while the other two air bag modules 111a and 111d each may have a gas generator for inflating, for example, a side air bag.

The ignition device is put in the gas generator included in each of these modules. Each of the ignition devices has two electrode pins 114 and 115, the former electrode pin 114 being connected to a first electric-supply conductor 112 connected to the central control unit 110, and the latter electrode pin 115 being connected to a second electric-supply conductor 113 connected to the central control unit 110.

Under a normal condition, that is, when a car does not encounter a particular accident requiring activation of one or more air bag modules 111a, 111b, 111c and 111d, the central control unit 110 periodically gives the electric-supply conductors 112 and 113 low electric current which is fed through the electrode pins 114 and 115 to the electric energy storing means (capacitors) of the ignition devices included in the four air bag modules 111a, 111b, 111c and 111d, respectively.

In the event that upon impact, the activation of, for example, the air bag module 111c is desired, the central control unit 110 feeds a particular electric pulse string constituting an ignition command for the ignition device of the air bag module 111c to the first electric-supply conductor 112. Although the particular electric pulse string is fed to each of the ignition devices through the electrode pins 114 and 115, only the IC included in the ignition device of the air bag module 111c responds to the command to supply the electric energy from the capacitor to the ignition element, thereby igniting the ignition powder in the manner described above.

Following the impact, if it is desired to activate some air bag modules, for example, the air bag modules 111a and 111b, the central control unit 110 gives the first electric-supply conductor 112 a particular electric pulse string for each of the ignition devices included in the air bag modules 111a and 111b, respectively. The two ignition devices operate in the same manner as described above.

What is claimed is:
1. A header assembly having a plurality of electrode pins and closing the opening of a cup body having ignition powder therein, characterized in that said header assembly comprises:
(a) a header holding said plurality of electrode pins to be insulated from one another;

(b) an ignition element mounting capacitor including outer circumferential surfaces and, at the center of its outer circumferential surfaces, external terminal electrodes;
(c) said external terminal electrodes being for electrically connecting to an ignition element mounted on the capacitor;
(d) said ignition element being a semiconductor bridge (SCB) chip comprising an SCB and its substrate mounted directly on the capacitor;
(e) an IC including
  (i) first, second, and third electrode pads to be electrically connected to end electrodes of said ignition element mounting capacitor and said external terminal electrodes, and
  (ii) connection electrodes to be electrically connected to the electrode pins of said header for communication external to said header,
wherein:
(f) said IC is located on said header; and
(g) said ignition element mounting capacitor is mounted directly on said IC and electrically connected to said electrode pins through said connection electrodes provided on said IC, wherein the term "IC" means integrated circuit.

2. The header assembly claimed in claim 1, characterized in that said capacitor is a ceramic capacitor.

3. The header assembly claimed in claim 2, characterized in that arranged on said header is a cylindrical collar having an outer diameter substantially equal to the outer circumferential diameter of said header and the cylindrical head reaching at least a level of the height of said ignition element, and that a resin is filled in a region inside said collar except for the element surface of said ignition element, thereby making flat the contact surface with the ignition powder.

4. A squib characterized in that the header assembly claimed in claim 2 is press-fitted in and fixed to the opening of a cup body having ignition powder therein.

5. The header assembly claimed in claim 1, characterized in that arranged on said header is a cylindrical collar having an outer diameter substantially equal to the outer circumferential diameter of said header and the cylindrical head reaching at least a level of the height of said ignition element, and that a resin is filled in a region inside said collar except for the element surface of said ignition element, thereby making flat the contact surface with the ignition powder.

6. A squib characterized in that the header assembly claimed in claim 5 is press-fitted in and fixed to the opening of a cup body having ignition powder therein.

7. A squib characterized in that the header assembly claimed in claim 1 is press-fitted in and fixed to the opening of a cup body having ignition powder therein.

8. A gas generator for an air bag, having the squib claimed in claim 7.

9. A gas generator for a seat belt pretensioner, having the squib claimed in claim 7.

* * * * *